Oct. 12, 1937.  J. J. DILKS, JR  2,095,632
MOTION PICTURE PROJECTOR
Filed Feb. 21, 1935  6 Sheets-Sheet 1
FIG. I
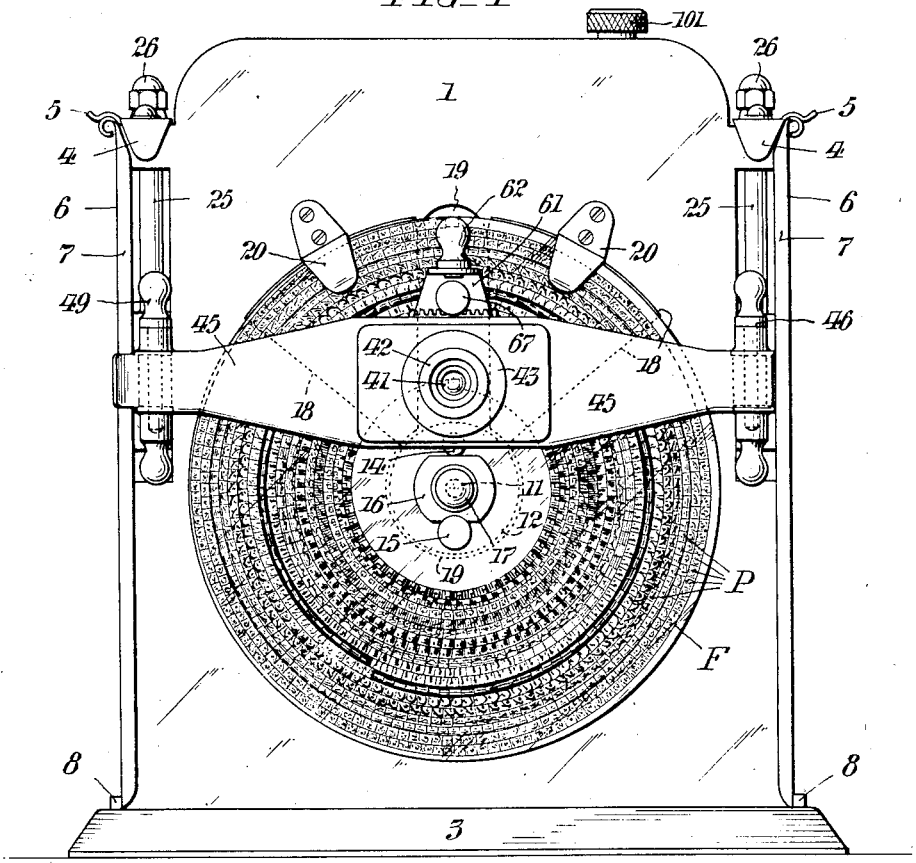
FIG. II
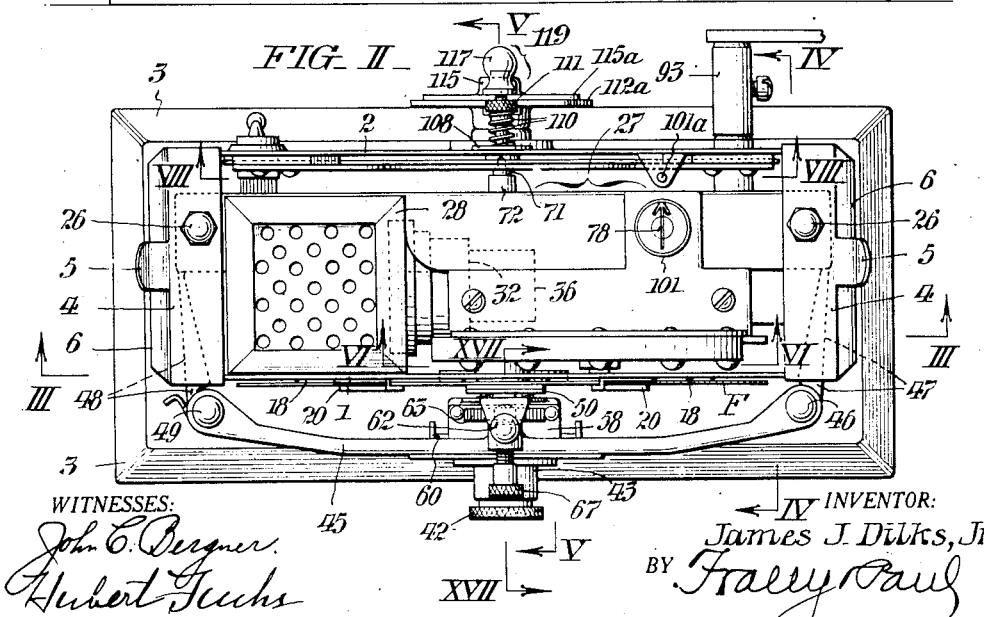
WITNESSES:
John C. Bergner
Herbert Fuchs
INVENTOR:
James J. Dilks, Jr.,
BY Harry Paul
ATTORNEYS.

Oct. 12, 1937.  J. J. DILKS, JR  2,095,632
MOTION PICTURE PROJECTOR
Filed Feb. 21, 1935   6 Sheets-Sheet 2
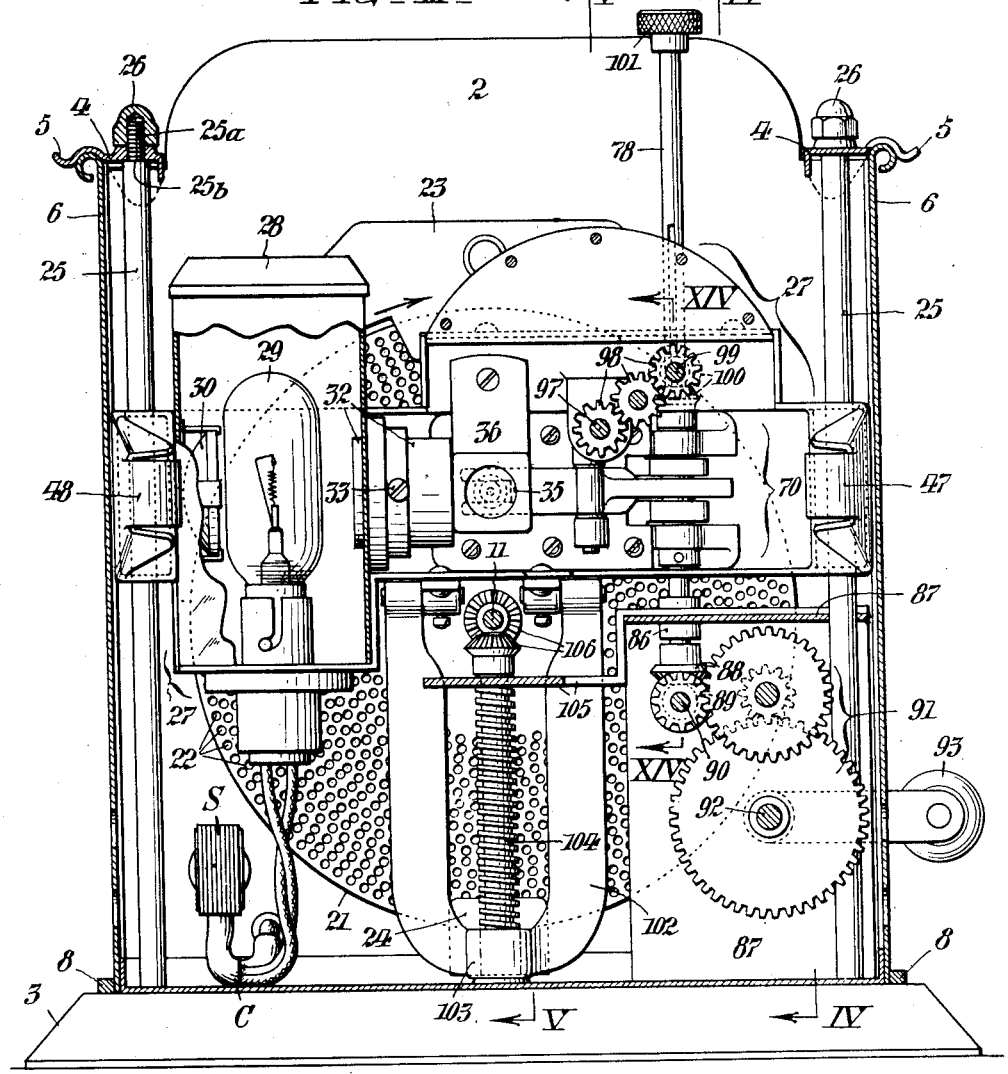
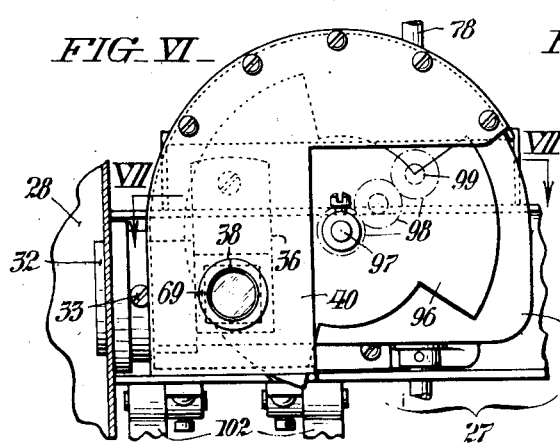
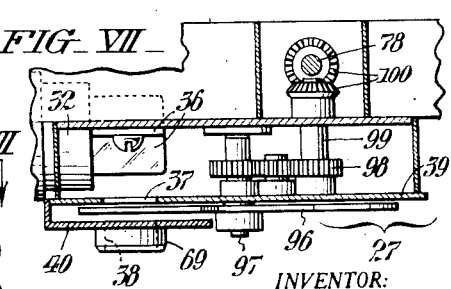
INVENTOR:
James J. Dilks, Jr.,
BY *Frailey Paul*
ATTORNEYS.

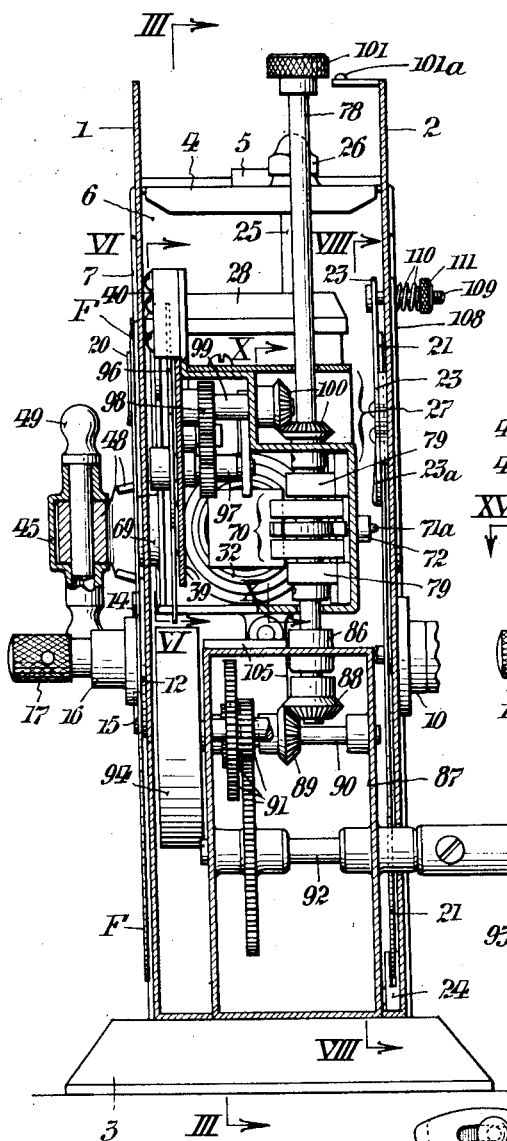

Oct. 12, 1937.  J. J. DILKS, JR  2,095,632
MOTION PICTURE PROJECTOR
Filed Feb. 21, 1935  6 Sheets—Sheet 4
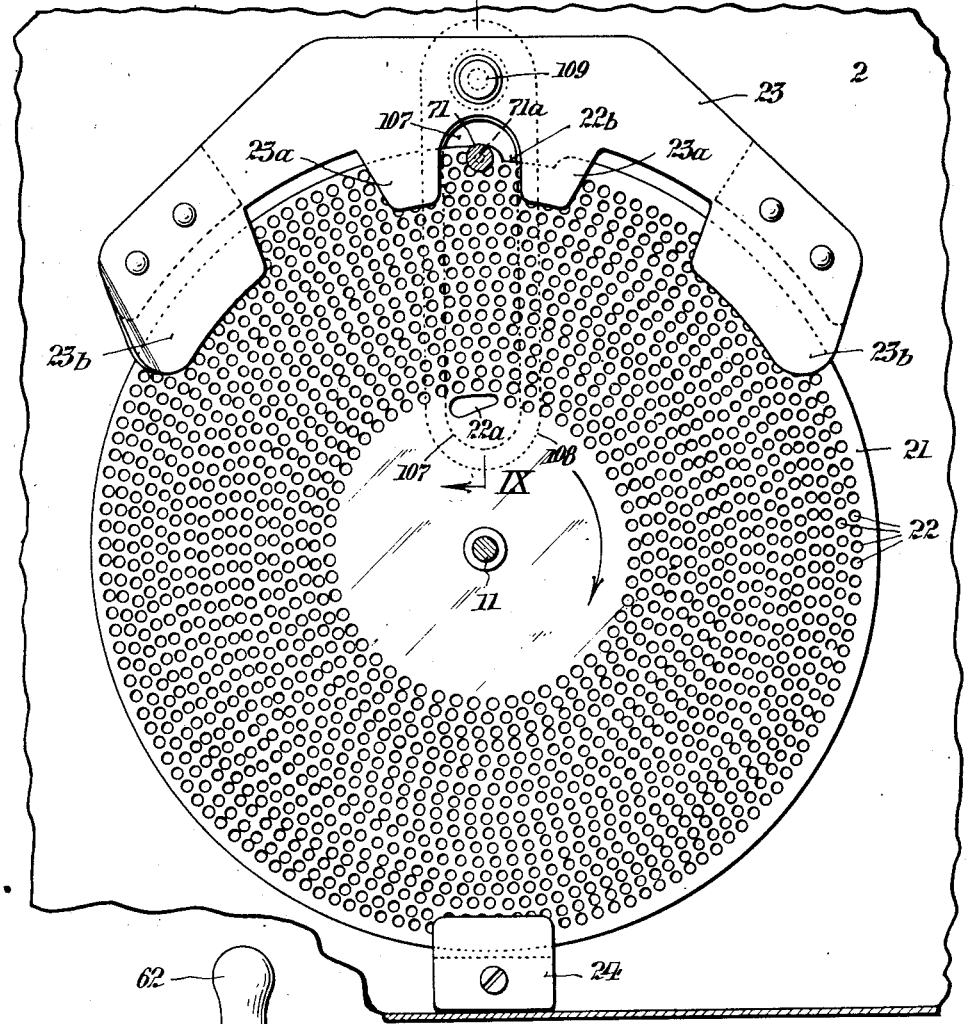
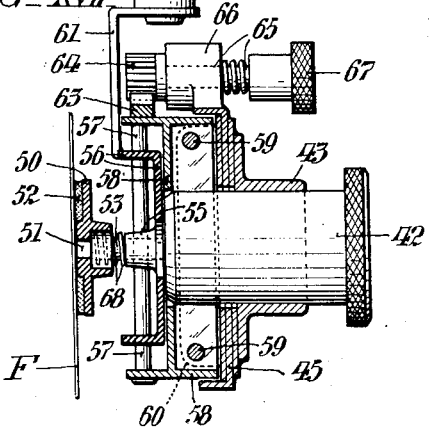
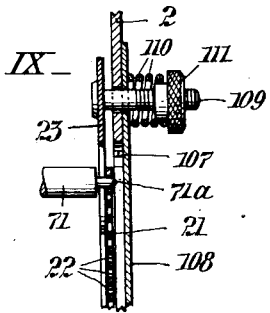
INVENTOR:
James J. Dilks, Jr.,
BY
ATTORNEYS.

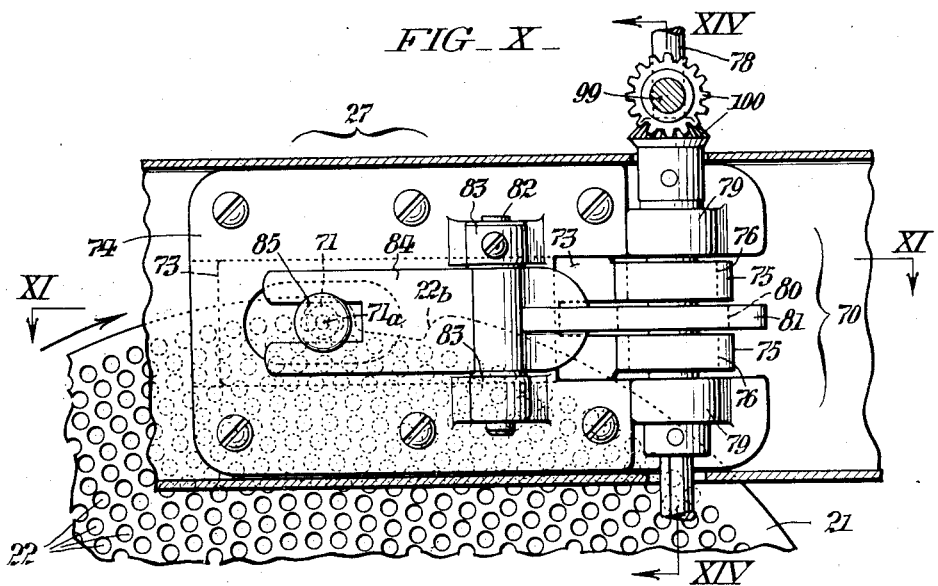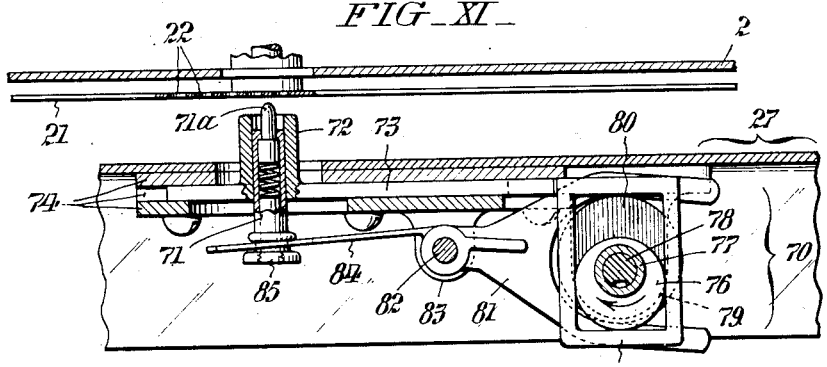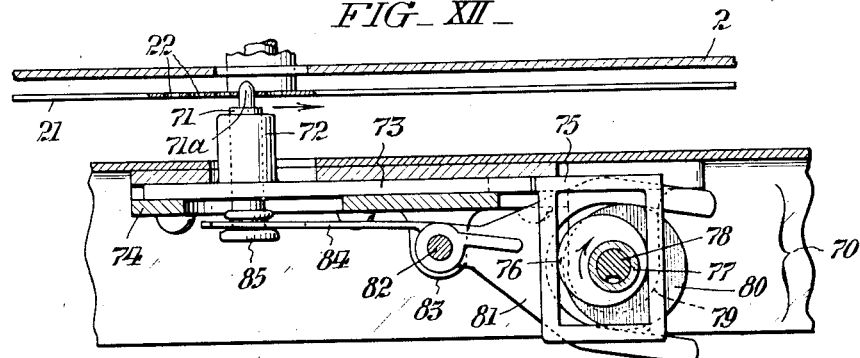

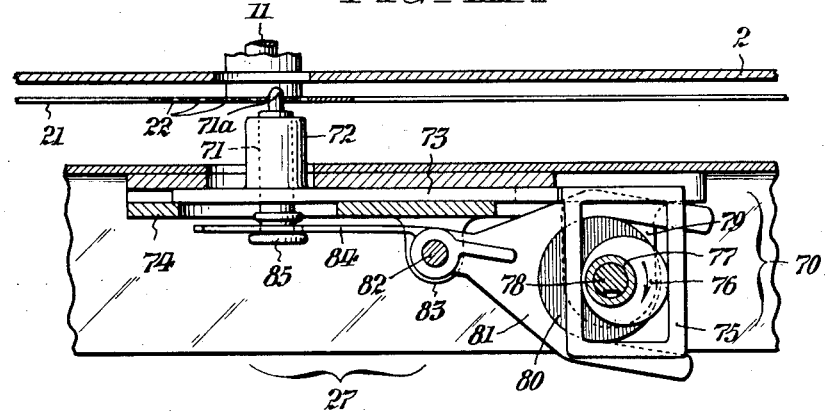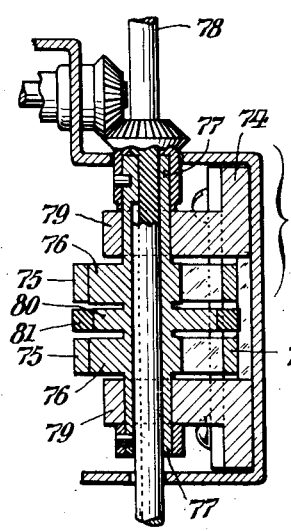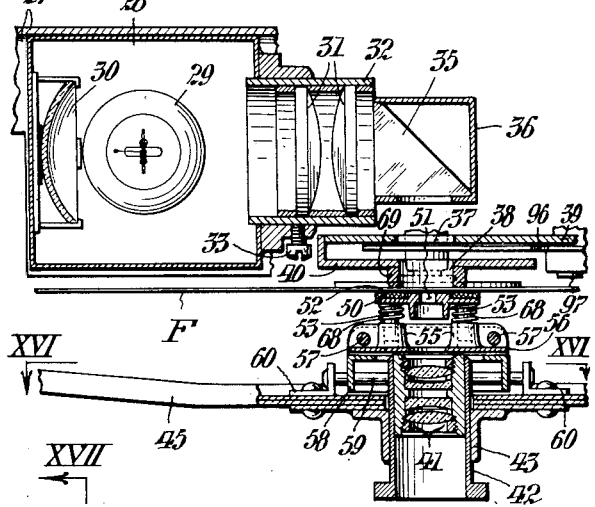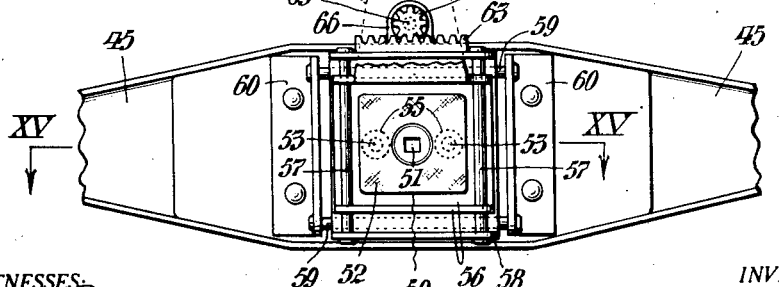

Patented Oct. 12, 1937

2,095,632

UNITED STATES PATENT OFFICE 2,095,632

MOTION PICTURE PROJECTOR

James J. Dilks, Jr., Philadelphia, Pa.

Application February 21, 1935, Serial No. 7,562

5 Claims. (Cl. 88—18.8)

This invention relates to motion picture projectors; and it has reference more particularly to film disk motion picture projectors.

Considered from the broadest aspect, my invention is directed toward the provision of a compact, simple, inexpensive and reliable projector for showing motion picture film disks such as featured in my co-pending application Serial Number 7,561 concurrently filed herewith, wherein the exposures or pictures are equally spaced along an expanding spiral swath originating on the film surface at a point near the center of the disk and terminating at the periphery.

In connection with a projector adapted for the special use referred to, it is an object of my invention to afford actuating mechanism capable of intermittently moving the film disk and the lens of the projector relatively so that the pictures are successively presented to said lens in accurate registry therewith, and of operating a lens shutter in properly timed relation to uncover the lens during the quiescent or dwell periods of the disk with attainment of a clear and sharply defined representation of the film subject on an exhibiting screen devoid of flicker or other annoying optical disturbances.

Another object of my invention is to provide means enabling the film disk and the projecting lens to be quickly set relatively for starting of the showing at any desired picture in the spiral series on the film.

Still other objects and attendant advantages will be manifest from the detailed description following of the attached drawings, wherein Fig. I shows my improved film disk motion picture projector in front elevation.

Fig. II shows the projector in plan.

Fig. III is a longitudinal sectional view of the projector taken as indicated by the arrows III—III in Figs. II and IV.

Figs. IV and V are transverse vertical sectional views taken as indicated by the arrows IV—IV and V—V in Fig. II.

Fig. VI is a fragmentary detail view taken as indicated by the arrows VI—VI in Figs. II, IV and V.

Fig. VII is a detail sectional view taken as indicated by the arrows VII—VII in Fig. VI.

Fig. VIII is a fragmentary sectional view taken as indicated by the arrows VIII—VIII in Figs. II, IV and V.

Fig. IX is a detail sectional view taken as indicated by the arrows IX—IX in Fig. VIII.

Fig. X is a detail sectional view taken as indicated by the arrows X—X in Fig. IV.

Figs. XI, XII and XIII are fragmentary sectional views taken as indicated by the arrows XI—XI in Fig. X.

Fig. XIV is a detail sectional view taken as indicated by the arrows XIV—XIV in Fig. X.

Fig. XV is a fragmentary sectional view taken as indicated by the arrows XV—XV in Figs. V and XVI.

Fig. XVI is a fragmentary view looking as indicated by the arrows XVI—XVI in Fig. XV.

Fig. XVII is a detail view taken as indicated by the arrows XVII—XVII in Figs. II and XVI; and Fig. XVIII is a detail view taken as indicated by the arrows XVIII—XVIII in Fig V.

As herein delineated, my improved film disk motion picture projector comprises a casing with flat front and rear walls 1 and 2 of sheet metal upstanding from a base 3. At the opposite ends of the casing the walls 1 and 2 are connected at the top by bridge pieces 4 whereof central spring tongue projections 5 engage over the curled top edges of removable end walls 6 also of sheet metal. These end walls 6 have lateral flanges 7 which lap the front and rear walls 1 and 2 of the casing, and, at the bottom, said end walls engage behind transverse ribs 8 on the base 3.

Journaled in bearings 9 and 10 respectively secured to the front and rear walls 1 and 2 substantially at the centers thereof, is a transverse shaft 11. To the protruding front end of the shaft 11 is secured a circular plate 12 having a beveled hub 13 and carrying a pair of outwardly projecting studs 14 and 15 which differ somewhat in diameter. The plate 12 serves as a mounting and backing for the film disk F whereof the exposures or pictures P are equi-spaced along a uniformly-expanding spiral swath originating near the center of the film and terminating at the periphery, said disk having an axial centering hole to fit over the tapered hub 13, and diametrically aligned drive apertures at opposite sides of the centering to fit over correspondingly allocated propelling studs 14 and 15 on the backing plate 12. Correct positioning of the disk film F on the shaft 11 is assured by virtue of the difference in the size of the studs 14 and 15. In order to prevent displacement of the disk film F, there is provided a flanged clamp member 16 with an attached rotatable finger nut 17 adapted to engage screw threads on the projecting frontal end of the shaft 11. From Fig. V it will be observed that the backing plate 12 is in the same plane with a pair of pads 18 of felt or velvet pasted or otherwise secured to the front wall 1 at opposite sides of a vertical slot 19 therein. Incident to being intermittently rotated in a manner later on explained, the film disk F is maintained yieldingly in contact with the pads 18 by a pair of retaining fingers 20 of thin spring metal which are secured to the front wall 1 by screws and which overlap the edge of the film disk as shown in Fig. I.

Mounted on the shaft 11 within the housing immediately adjacent the rear wall 2 of the latter is a drive disk 21 which has a spiral series of circular holes 22 corresponding in number and position with the pictures P on the film disk F. A terminal perforation 22a at the inner end of the spiral series of holes 22 in the drive disk is made circumferentially elongate for a purpose hereinafter set forth. Adjacent the outer terminal perforation of the series 22, the disk 21 is provided with a circumferentially elongate edge notch 22b, also for a purpose hereinafter described. A guard 23 of flexible sheet metal riveted to the inner side of the back wall 2 has downwardly projecting tongues 23a and 23b that lap the top portion of the drive disk 21 in order to steady it against whipping during rapid intermittent rotation. A fixed guard clip 24 performs a similar function at the lower portion of the disk 21.

Rising vertically from the base 3 adjacent opposite ends of the same and in the interval between the front and rear walls 1 and 2, are posts 25. The upper ends of these posts 25 are diametrically reduced and threaded as at 25a and pass through the bridge pieces 4. Nuts 26 engaging the threads 25a serve to clamp the bridge pieces 4 firmly against the top shoulders 25b of the posts 25, thereby increasing the rigidity of the casing. Guided for up and down movement on the posts 25 is a carriage 27 which is fashioned to hollow box-like configuration from sheet metal, and whereto is attached, at the left hand end (Figs. II, III and XV), a housing 28 containing a luminous source in the form of a high powered incandescent bulb 29 which receives electric current by way of a flexible conductor cable C under control of a snap switch S. The light from the bulb 29 is directed by a parabolic reflector 30 through a pair of condensing lenses 31 in a holder tube 32 which is adjustably secured within a boss at one side of the lamp housing 28 by means of a screw 33. A prism mirror 35 supported by a holder 36 within the hollow of the carriage 27 deflects the concentrated light rays from the condenser lens 31 forwardly through coincident openings 37 and 38 respectively in the front plate 39 of the carriage 27 and in an attached supplemental plate 40 spaced by a narrow interval from said front plate. These openings 37 and 38, it will be observed from Fig. III, are in the vertical line of the shaft 11 and in direct registry with the projecting lens which are indicated at 41 in Fig. XV. The tubular holder 42 for the projecting lens 41 is removably engaged in a boss 43 centrally of a gate 45 at the front of the projector, said gate having a hinge connection 46 with a forwardly reaching arm 47 at one end of the carriage 27 so as to be swingable outward for convenience of removing the disk film F and replacing it with others. The opposite end of the gate 45 is detachably secured to a forwardly reaching arm 48 at the corresponding end of the carriage 27, by a removable pintle 49. Supported at the back of the gate 45, with capacity for adjustment laterally as well as up and down relative to the lens 41, is the aperture plate 50 of the projector, said plate having a rectangular lens aperture 51 corresponding in size with the pictures P on the film disk F, and faced with felt or velvet 52 for contact with said disk, see Fig. XV. As shown in Figs. XV, XVI and XVII, the aperture plate 50 has a pair of forwardly projecting studs 53 slidable in bosses 55 of a slide 56 which frictionally engages a pair of spaced vertical rods 57 on another slide 58, which, in turn, frictionally engages a pair of spaced horizontal rods 59 secured at their ends in flange bars 60 on the gate 45. The slide 56 has an upward extension 61 with a manipulating grasp handle 62; and secured crosswise of said extension is a toothed rack 63 which meshes with a spur pinion 64 at the inner end of a shaft 65. As shown, this shaft 65 is journaled in an upward lug 66 of the gate 45, and is fitted at its outer end with a knurled finger knob 67. By the means just described, it is obviously possible to properly locate the pictures with reference to the screen upon which they are projected. Helical compression springs 68 surrounding the studs 53 urge the aperture plate 50 inwards so that the protective facing 52 is yieldingly maintained in contact with the disk film F, the pressure of said aperture plate being resisted by a flange 69 surrounding the aperture 38 in the supplemental plate 40 of the carriage 37. As shown in Fig. V, the flange 69 projects forwardly through the vertical slot 19 in the front wall 1 of the casing with its face substantially in the plane of the felt pads 18 on said front wall.

By a racking means 70, supported within the hollow of the carriage 27, the perforated drive disk 21 is intermittently rotated in the direction of the arrow in Figs. III and VIII so that the pictures on the disk film F are successively presented at the opening 51 in the aperture plate 50 for projection through the lens 41. As shown in Figs. X—XIII the racking means 70 comprises a horizontally reciprocated picker pin 71 which is in line with the projecting lens 41, and which is axially shiftable in the lateral boss 72 of a slide 73 confined to longitudinal movement in a guideway 74 on the carriage 27. From Fig. XI it will be noted that the pin 71 has a rounded tip 71a of a diameter to snugly fit the circular holes 22 of the drive disk 21. At one end, the slide 73 is formed with vertically-spaced rectangular loops 75 for cooperation with eccentric cams 76 on a sleeve 77 which is splined, with capacity for axial movement, on a vertical shaft 78, and which is journaled in vertically spaced bearings 79 on the carriage 27. Secured to the sleeve 77 in the interval between the cams 76, is another eccentric cam 80 which coacts with the forked end of an arm 81 with fulcrum support on a pin 82 engaged in vertically spaced lugs 83 of the guide 74. The arm 81 is formed with a clevised spring finger 84 which engages a circumferential groove in the headed end 85 of the picker pin 71. As the sleeve 77 is rotated in the direction of the arrows in Figs. XI—XIII, the slide 73 will be moved leftward horizontally by action of the cams 76. Concurrently with this movement of the slide 73 the picker pin is urged outwardly of the boss 72 of the slide toward the drive disk 21 so that at the end of the movement, the rounded tip 71a of said pin is thrust into one of the holes 22 of said disk. As the rotation of the sleeve 77 continues, the slide 73 is moved to the right, with the result that the drive disk 21 is rotated to a distance corresponding to the circumferential spacing of the holes 22 therein. Just as the slide 73 completes its rightward movement, the picker pin 71 is withdrawn from the drive disk 21 through concurrent action of the cam 80 upon the forked arm 81.

In addition to being sustained by the sleeve 77, the vertical shaft 78 is afforded rotative support in a fixed bearing 86 at the top of a gear housing 87 within the casing of the projector. At its lower end, the vertical shaft 78 is fitted with a miter gear 88 which meshes with a companion miter gear 89 on a horizontal shaft 90 within the housing. By means of a train of spur gears 91 the horizontal shaft 90 is driven at increased speed from a main shaft 92 within the housing 87. This main shaft 92 extends through the back wall 2 of the projector casing where it is provided with a hand crank 93. If desired, the shaft 92 may be driven by a spring motor, an electric motor or any other convenient source of power. A relatively heavy fly wheel 94 (Fig. IV) on the shaft 90 functions as a governor to stabilize the action of the moving parts.

During the shift phases of the drive plate 21 and the film disk F, the projecting lens 41 is obscured by a rotary shutter 96 fast on a transverse shaft 97 which is suitably journaled on the carriage 27, the vanes of said shutter moving through the narrow interval between the front plate 39 and the supplemental plate 40 of the carriage crosswise of the light apertures 37 and 38. The shutter shaft 97 is driven, through a series of spur gears 98, from a parallel shaft 99, which receives motion in turn, through a miter gear couple 100, from the vertical shaft 78. As shown, the shaft 78 is provided at the top with a manipulating knob 101, which, when turned to align an arrow thereon (Fig. II) with a marker 101a on the rear wall 2 of the projector casing, positions the cam sleeve 77 on said shaft with the picker pin withdrawn from engagement with the drive disk 21. The purpose of this provision will be presently explained.

Pendant from the carriage 27 is a pivotally connected yoke member 102 which is formed centrally of its bottom end with an internally threaded boss 103 that engages a vertical screw spindle 104. This screw spindle 104 has bearing at its lower end in the base 3, and at its upper end in a bracket plate 105 secured to the gear housing 87. The screw spindle 104 receives intermittent motion through a pair of miter pinions 106 from the shaft 11 of the drive disk 21. Thus, during the intermittent rotative shifts of the drive disk 21 under the actuation of the racking means 70, the carriage 27 with all its appendages, is compensatively shifted vertically i. e. radially of the shaft 11, so that the picker pin 71 is caused to accurately follow the spiral line of holes 22 in said drive disk, and the projecting lens 41 to follow the spiral line of pictures on the film disk F.

The position of the picker pin 71 relative to the drive disk 21 may be observed through a vertical slot 107 in the back wall 2 of the projector casing, said slot being normally closed by a cover 108 which is pivotally supported on a pin 109 reaching outward from the guard member 23 through said back wall. A helical spring 110 interposed between the cover member 108 and a thumb nut 111 threaded on the end of the pin 109 serves to frictionally hold the cover 108 either in the open or closed position. Through the thumb nut 111, it is also possible to adjust the central position of the guard 23 relative to the back wall 2 of the projector casing and thereby vary the frictional restraint imposed upon the drive disk 21 by the projections 23a of said guard.

As shown in Figs. V and XVIII, the drive disk 21 is mounted on the shaft 11 with capacity for slight circumferential adjustment in order that exact coordination may be had between the apertures 22 of said film disk and the corresponding pictures of the film disk F. The adjustment means includes a winged collar 112 which is fixed by a screw 114 upon the hub 113 of the drive disk 21 exteriorly of the projector; and a winged collar 115 fixed by a screw 116 upon the protruding end of the shaft 11 in abutting relation to the collar 112. The wings 112a of the collar 112 have tapped apertures receiving the threaded shanks 117a of a pair of finger knobs 117; while the wings 115a of the collar 115 are provided with arcuate slots 118 concentric with the shaft 11 for passage of the knob shanks. In making the adjustment with the described arrangement, the knobs 117 are first loosened, the winged collars 112 and 115 relatively shifted to the required extent; and after this has been done, the knobs 117 are tightened to hold the adjustment. Jointly, the winged collars 112 and 115 constitute a double crank 119 whereby the shaft 11 may be turned for a purpose hereinafter disclosed.

The operation of my novel film disk motion picture projector is as follows: Let it be assumed that the shaft 92 (Fig. III) is being rotated by the crank handle 93 with impartation of like movement to the vertical shaft 78 through the gears 91, 88 and 89. Under the influence of the rotary cams 76 and 80 on the splined slidable sleeve 77 surrounding the vertical shaft 78, the picker pin 71 is withdrawn from one hole 22 in the drive disk 21, shifted horizontally, inserted into the next hole of the spiral series in said disk, and then shifted horizontally in the opposite direction as already understood. By repetitions of this operative cycle of the picker pin 71, the drive disk 21 and the film disk F are intermittently rotated together in the direction of the arrow in Fig. III, with the result that the pictures on said film disk are successively presented to the lens aperture 51 (Fig. XV) for projection through the lens 41, by the concentrated beam from the light source 29 directed into the openings 37 and 38 from behind. Concurrently with the intermittent rotation of the film disk F, the carriage 27 and the attached gate 45 are progressively and compensatively moved upward by action of the screw spindle 104, to shift the aligned picker pin 71 and lens 41 radially of the shaft 11 so as to accurately follow the coinciding spiral lines of the drive disk holes 22 and the pictures of said film disk. This action continues until immediately upon projection of the last picture at the outer end of the spiral series on the film disk F, the peripheral notch 22b on the drive disk 21 arrives at the picker pin 71, which thereafter plays idly within said notch (which is of a length in excess of the throw of the picker pin) without imparting further movement to said drive disk. With the showing of the film disk now completed, the locking pin 49 (Figs. I and II) is withdrawn, and the gate 45 swung outward upon its pivotal connection 46 with the carriage 27, so that the film disk F can be taken from the shaft 11 upon removal of the holder clamp 16. After this is accomplished, the knob 101 at the top of the vertical shaft 78 is turned until the arrow thereon registers with the marker 101a on the casing, whereby, as hereinbefore explained, the picker pin 71 is placed in retracted position out of engagement with the drive disk 21. The shaft 11 is thereupon rapidly turned counterclockwise (as considered in Figs. I and III) by means of the crank 119 at the back of the projector. Through attendant reverse rotation of the screw spindle 104, the carriage 27, and with it the picker stud 71, the projecting lens 41 and the rotating shutter 96 are moved downwardly. The reverse rotation of the shaft 11 is continued until the elongate aperture 22a (which like the notch 22b is of a length in excess of the picker throw) at the inner end of the spiral series of holes 22 in the disk 21 registers with the picker pin 71. Setting of the projector as just explained, is facilitated by observation of the picker pin 71 through the slot 107 in the back wall 2 of the projector casing. Another film is then mounted on the drive shaft 11, made fast by the clamp 16, and the gate 45 thereupon swung inward into the operative position and latched by means of the pin 49. With the new film disk in place, the shaft 11 is given a slight shift by means of the crank 117, and the vertical shaft 78 given a slight twist by means of the knob 101 at the top thereof to bring the picker pin into the first hole 22 at the inner end of the spiral series in the drive disk 21. The driving crank handle 93 is thereupon turned to exhibit the new film through operation of the projector mechanism as hereinbefore explained.

Through the facilities provided for relatively setting the picker pin 71 and the drive disk 21, it is evident that the showing may be begun at any desired picture in the spiral series on the film disk.

Obviously the projector may be utilized for film disks wherein the pictures originate at the periphery of the disk and terminate at the inner end of the spiral, simply by turning the crank handle 93 in a reverse direction with attendant impartation of reverse movements to the parts of the mechanism. Under these conditions, the rotation of the film disk will automatically cease upon arrival of the elongate aperture 22a of the drive disk 21 at the picker pin 71 immediately upon projection of the last picture at the inner end of the spiral series on said film disk.

Having thus described my invention, I claim:

1. In a film disk motion picture projector, a casing; a projecting lens exteriorly of the casing; a shaft journaled within the casing; a mounting determining a definite position for the film disk on the shaft externally of the casing; a drive disk on the shaft interiorly of the casing and having spirally arranged holes corresponding in number and position with spirally arranged pictures on the film disk; means to coact successively with the holes in the drive disk to intermittently rotate the film disk for successive presentation of its pictures to the projecting lens; and means exteriorly of the casing whereby the drive disk may be adjusted circumferentially of the shaft to accurately align its holes with the pictures of the film.

2. In a film disk motion picture projector, a casing; a projecting lens exteriorly of the casing; a shaft journaled within the casing; a mounting determining a definite position for the film disk on the shaft externally of the casing at the front; a drive disk on the shaft interiorly of the casing having spirally arranged holes corresponding in number and position with spirally arranged pictures on the film disk; means to coact successively with the holes of the drive disk to intermittently rotate the film disk for successive presentation of its pictures to the projecting lens; and means exteriorly of the casing whereby the drive disk may be adjusted circumferentially of the shaft to accurately align its apertures with the pictures of the film disk, including a collar fixed on the protruding hub of the disk at the rear of the casing, a second collar fixed on the rear end of the shaft in abutting relation to the first collar; and releasable clamp means for securing collars together in adjusted position.

3. In a film disk projector, a casing with a base, and flat front and rear walls; a pair of posts within the casing upstanding from the base at opposite ends; a shaft extending transversely through the front and rear walls of the casing; a mounting on the front protruding end of the shaft for the disk film; a driving disk on the shaft interiorly of the casing having spirally arranged holes corresponding in number and position to spirally arranged pictures on the film disk; a carriage guided for vertical movement within the casing by the posts aforesaid; a gate extending across the front of the casing, said gate being pivotally connected to the carriage at one end so that it may be swung out of the way incident to mounting the film; a projecting lens carried by the gate; picker means on the carriage within the casing to coact successively with the holes in the drive disk to intermittently rotate the film for successive presentation of its pictures to the projecting lens; screw means within the casing driven from the shaft for moving the carriage up and down radially of the shaft to cause the lens and the picker means to follow the changing curvature of the spirals of the drive and film disks; a vertical shaft journaled within the casing; rotary cams on the carriage having a splined connection with the shaft for actuating the picker means; and means for continuously rotating said vertical shaft.

4. A disk film motion picture projector comprising a projecting lens; a shaft with a mounting thereon for a disk film having spirally-arranged pictures; a drive disk on the shaft having spirally-arranged holes corresponding in position and number with the pictures on the film disk; a picker for successively engaging the holes of the drive disk to progressively rotate the latter; a carriage for the lens and the picker confined to movement radially of the shaft; a positive drive connection between the shaft and the carriage whereby the carriage and the picker supported thereby are shifted radially concurrently with each rotative shift of the film disk to compensate for the changing curvature of the spiral line of holes in the drive disk; a backing plate with a cushioning facing for the drive disk; and a pair of cooperative tongues bearing on the front face of the drive disk at opposite sides of the line of radial movement of the picker to prevent whipping of said disk during operation of the projector.

5. A disk film projector according to claim 4, wherein the tongues are on a guard plate; and including means whereby the guard plate can be adjusted relative to the backing plate to vary the pressure of the tongues upon the drive disk.

JAMES J. DILKS, JR.